(12) United States Patent
Hu

(10) Patent No.: US 8,436,566 B2
(45) Date of Patent: May 7, 2013

(54) MULTI-SPEED CONTROL APPARATUS FOR FAN MOTOR

(75) Inventor: Fengquan Hu, Hui Zhou (CN)

(73) Assignee: Cooler Master Co., Ltd., Chung-Ho (TW)

( * ) Notice: Subject to any disclaimer, the term of this patent is extended or adjusted under 35 U.S.C. 154(b) by 272 days.

(21) Appl. No.: 13/019,546

(22) Filed: Feb. 2, 2011

(65) Prior Publication Data

US 2012/0194115 A1    Aug. 2, 2012

(51) Int. Cl.
*H02P 7/06* (2006.01)
*H02P 1/26* (2006.01)

(52) U.S. Cl.
USPC ........... 318/461; 318/268; 318/471; 318/772; 388/803; 388/804

(58) Field of Classification Search .................. 318/249, 318/268, 461, 471, 472, 772, 400.19; 388/803, 388/804
See application file for complete search history.

(56) References Cited

U.S. PATENT DOCUMENTS

| | | | | |
|---|---|---|---|---|
| 4,788,827 A * | 12/1988 | Otani | | 62/126 |
| 5,332,151 A * | 7/1994 | Kwak | | 236/49.3 |
| 5,619,860 A * | 4/1997 | Yuji et al. | | 62/163 |
| 5,718,373 A * | 2/1998 | Kim et al. | | 236/35 |
| 5,929,591 A * | 7/1999 | Katou et al. | | 318/723 |
| 6,087,793 A * | 7/2000 | Preis | | 318/434 |
| 6,125,798 A * | 10/2000 | Kuwayama et al. | | 123/41.12 |
| 6,274,991 B1 * | 8/2001 | Busch | | 318/400.32 |
| 6,396,231 B1 * | 5/2002 | Horng et al. | | 318/471 |
| 6,703,803 B2 * | 3/2004 | Ohiwa et al. | | 318/400.17 |
| 7,038,408 B2 * | 5/2006 | Lin et al. | | 318/268 |
| 7,064,517 B2 * | 6/2006 | Kiuchi et al. | | 318/802 |
| 7,091,689 B2 * | 8/2006 | Lee | | 318/400.21 |
| 7,151,349 B1 * | 12/2006 | Williamson et al. | | 318/400.37 |
| 7,187,853 B2 * | 3/2007 | Mayer | | 388/803 |
| 7,466,086 B2 * | 12/2008 | Kiuchi et al. | | 318/41 |
| 7,489,094 B2 * | 2/2009 | Steiner et al. | | 318/249 |
| 7,580,617 B2 * | 8/2009 | Yabe | | 388/811 |
| 7,667,428 B2 * | 2/2010 | Wei et al. | | 318/809 |
| 7,671,549 B2 * | 3/2010 | Steiner et al. | | 318/249 |
| 7,863,854 B2 * | 1/2011 | Izaki et al. | | 318/803 |
| 8,049,373 B2 * | 11/2011 | Ishikawa | | 307/130 |
| 8,193,744 B2 * | 6/2012 | Steiner et al. | | 318/249 |
| 2003/0155886 A1 * | 8/2003 | Ohiwa et al. | | 318/727 |
| 2005/0002656 A1 * | 1/2005 | Mayer | | 388/804 |
| 2005/0040778 A1 * | 2/2005 | Lin et al. | | 318/268 |
| 2005/0127865 A1 * | 6/2005 | Kiuchi et al. | | 318/802 |
| 2005/0264250 A1 * | 12/2005 | Lee | | 318/471 |

(Continued)

*Primary Examiner* — Paul Ip

(74) *Attorney, Agent, or Firm* — C. G. Mersereau; Nikolai & Mersereau, P.A.

(57) ABSTRACT

Disclosed is a multi-speed control apparatus for a fan motor. The apparatus includes a driving member, a motor speed sensing member, a resistor circuit, a voltage-division resistor, and a multi-segment switch. The driving member has a controlled end connected with the multi-segment switch. The driving member has an output end connected with the fan motor. The driving member has a detection end connected with the motor speed sensing member. The resistor circuit includes some resistors with various resistances. The multi-segment switch interconnects the resistor circuit, the voltage-division resistor, the controlled end of the driving member, and a voltage source. This switch is optionally connected to the resistor disposed in the voltage source or voltage-division resistor. An input voltage is created across the resistor by dividing the voltage. The driving member is therefore provided for driving the fan motor to a rotating speed according to the input voltage.

10 Claims, 4 Drawing Sheets

U.S. PATENT DOCUMENTS

| | | | |
|---|---|---|---|
| 2007/0013325 A1* | 1/2007 | Kiuchi et al. | 318/34 |
| 2007/0114963 A1* | 5/2007 | Steiner et al. | 318/772 |
| 2007/0285859 A1* | 12/2007 | Wei et al. | 361/91.1 |
| 2008/0050101 A1* | 2/2008 | Yabe | 388/831 |
| 2009/0072775 A1* | 3/2009 | Steiner et al. | 318/400.19 |
| 2009/0224712 A1* | 9/2009 | Izaki et al. | 318/400.32 |
| 2010/0066177 A1* | 3/2010 | Ishikawa | 307/130 |
| 2010/0109597 A1* | 5/2010 | Steiner et al. | 318/772 |

* cited by examiner

MULTI-SPEED CONTROL APPARATUS FOR FAN MOTOR

BACKGROUND OF THE INVENTION

1. Field of the Invention

The instant disclosure relates to a control apparatus for a fan motor, more particularly to a multi-speed control apparatus for the fan motor.

2. Description of Related Art

Refer to FIG. 1, which shows a circuit diagram of a control apparatus for the conventional fan motor. In the figure, a controller 10 is provided in the control apparatus 1 for driving a fan motor 12. This controller 10 may be implemented as an integrated circuit (IC) which has some contacts for connecting the circuits, such as the shown Hall element 14, a converter 16, etc. The Hall element 14 is usually used for detecting the state of rotation of the fan motor 12, and momentarily generates a feedback signal (not shown) to the controller 10.

The converter 16 is especially used to convert the pulse-width modulation signal (SPWM) input from some external elements including processor or IC into a voltage signal V1. The voltage signal V1 is then input into the controller 10. In general, the duty cycle of the pulse-width modulation signal may change due to the change (up or down) of temperature of the external devices depending on the environmental conditions and system of operation. Noted that the voltage signal V1 is determined based on the duty cycle of the PWM signal.

In other words, the controller 10 may change the rotating speed of the fan motor 12 anytime based on the change of the voltage signal V1. Thus, the rotating speed of the fan motor 12 may be modulated automatically due to some external conditions such as the temperature of the external devices.

However, the PWM signal generated by the external devices may not accurately present the real temperature. Further, the process of the converter 16 converting the PWM signal into the controller 10 readable voltage signal V1 may cause the voltage signal V1 to be distorted or delayed. In short, the controller 10 may not accurately control the rotating speed of the fan motor 12 to fit in with the need of heat dissipation by merely referring to the external PWM signal.

SUMMARY OF THE INVENTION

A multi-speed control apparatus is particularly introduced in one of the embodiments in accordance with the instant disclosure to driving a fan motor. In which, a multi-segment switch is employed to implement the multi-speed control by creating multiple input voltages with various values to a controlled end of a driving member thereof. Therefore, the driving member may be activated by multiple voltages in order to drive the fan motor to corresponding rotating speeds.

According to one embodiment, the multi-speed control apparatus used for the fan motor includes a driving member, a motor speed detection member, a resistor circuit, a voltage-division resistor, and a multi-segment switch. The controlled end of the driving member is connected with the multi-segment switch. An output end of the driving member is connected with the fan motor. Further, a detection end of the driving member is connected to the motor speed detection member, and used to receive a feedback signal from this detection member. The resistor circuit particularly includes several resistor elements with various resistances.

Further, the multi-segment switch is preferably connected to the resistor circuit, the voltage-division resistor, the controlled end of the driving member, and a voltage source. The multi-segment switch is optionally connected to any resistor element across the voltage source and a voltage-division resistor. An input voltage may then be created across the resistor element by dividing voltage. The driving member is to drive the fan motor to a specific rotating speed according to the input voltage.

To sum up the above description, the multi-speed control apparatus for the fan motor is incorporated into the invention to conduct the voltage source interconnecting any one of the voltage-division resistor and the resistor circuit through the multi-segment switch. Then the input voltage across the resistor element is delivered to the controlled end of the driving member. Thus the driving member, based on the input voltage, accurately drives the fan motor to the specific rotating speed without influence resulting in any environmental factor.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENTS

The multi-speed control apparatus for the fan motor in accordance with the instant disclosure is mainly provided with a multi-segment switch. The switch is used to forward multiple input voltages to a driving member in segments. Then the driving member is able to drive the fan motor to operate with different rotating speeds according to the input voltages. The following embodiments in accordance with the instant disclosure describe the invention in detail. The fan motor exemplarily is equipped with a three-segment control apparatus for controlling the rotating speed thereof. The implementation of the control apparatus for the fan motor is not only limited to the described three-segment control apparatus, but also to the multi-speed control apparatus in accordance with the above-described concept.

Figure 1:
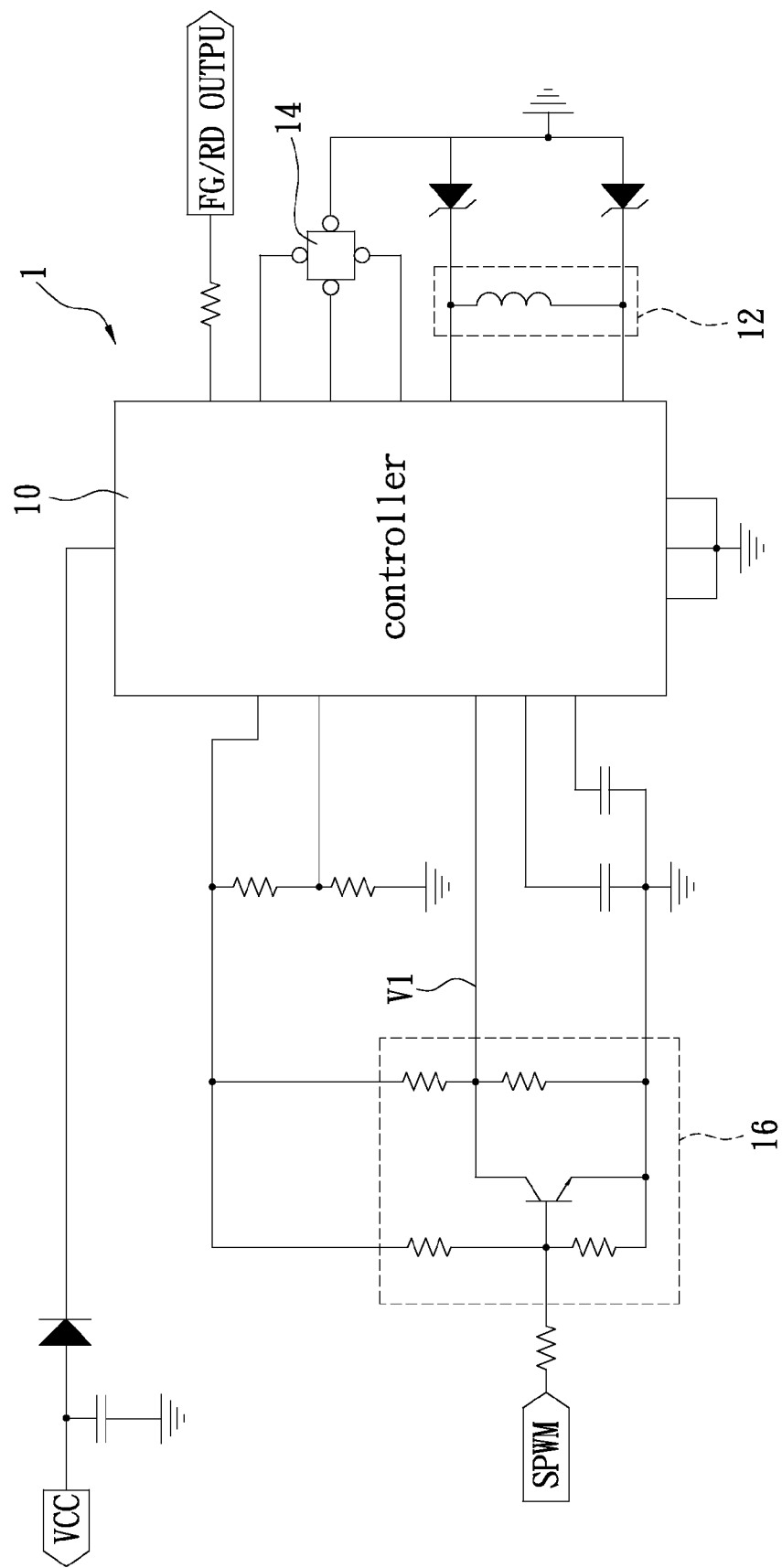
FIG. 1 shows a circuit diagram of the conventional control device for the fan motor.
Figure 2:
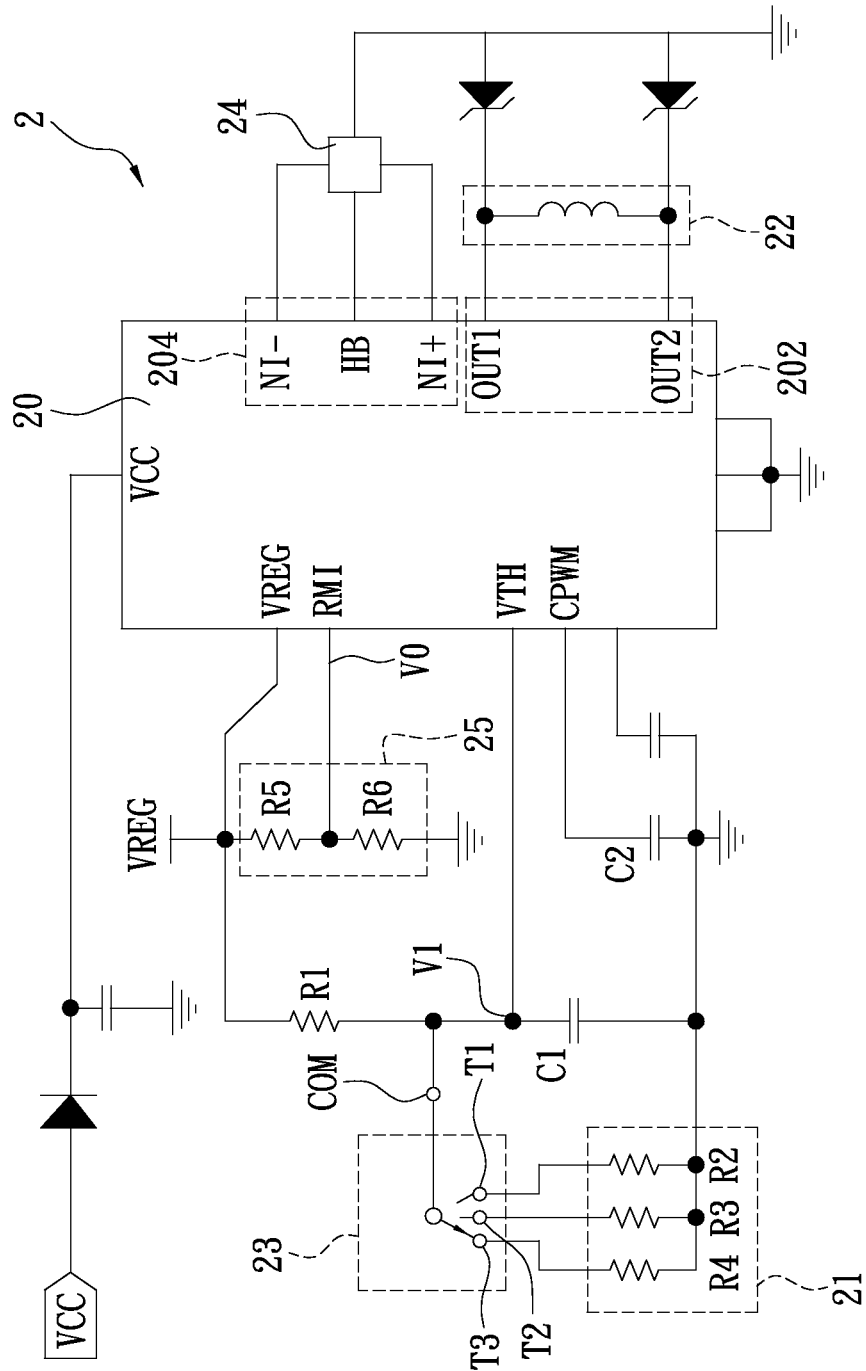
FIG. 2 shows a circuit diagram illustrating the multi-speed control apparatus for the fan motor in accordance with the instant disclosure.

Reference is made to FIG. 2. The shown multi-speed control apparatus 2 includes a driving member 20, a resistor circuit 21, a voltage-division resistor R1, and a multi-segment switch 23. The driving member 20 may be implemented by an integrated circuit (IC), a micro-controller (MCU), or a single chip. The functionalities provided in the driving member 20 may be performed through a circuitry and/or software.

Furthermore, the driving member 20 has a controlled end VTH, an output end 202, and a detection end 204. The output end 202 is connected with a fan motor 22. The detection end 204 is connected with a motor speed detection member 24. In detail, the output end 202 of the driving member 20 includes a first output pin OUT1 and a second output pin OUT2. Both the first output pin OUT1 and the second output pin OUT2 are connected with coil of the fan motor 22. The detection end 204 has a positive input pin NI+, a negative input pin NI−, and a bias-voltage pin HB. Further, the bias-voltage pin HB sends out a fixed bias to the motor speed detection member 24. The mentioned positive input pin NI+ and negative input pin NI− respectively receive the feedback signals from the motor speed detection member 24.

The motor speed detection member 24 may be a Hall sensing integrated circuit (HALL IC). The Hall IC is configured to be an element using a sensing current to present the change of magnetic field. In the present case, the Hall IC is to detect the position of rotor of the fan motor 22. Therefore, the driving member 20 uses a feedback signal generated in response to the change of magnetic field generated by the Hall sensing integrated circuit to acquire the position of rotor of the fan motor 22. The output signal for controlling the operation of the fan motor 22 is accordingly modifiable.

As FIG. 2 shows, the resistor circuit 21 includes a plurality of resistor elements with various resistances. The number of the resistor elements of the resistor circuit 21 is determined in accordance with the number of segments. In other words, since the resistor circuit 21 are made by the resistor elements R2, R3 and R4 which are with different resistances, the multi-speed control apparatus 2 embodies three-segment rotating speeds, including a low-speed state, a medium-speed state, and a high-speed state. However, the described number of the resistor elements may not limit the implementations of the multi-speed control apparatus 2 in accordance with the instant disclosure.

This multi-segment switch 23 is interconnected with the resistor circuit 21, the voltage-division resistor R1, the controlled end VTH of the driving member 20, and the voltage source VREG. The multi-segment switch 23 selectively connects to the voltage source VREG the voltage-division resistor R1, and any one of the resistor elements R2, R3, and R4. The mentioned voltage source VREG creates an input voltage V1 via the voltage-division resistor R1 across any one of the resistor elements R2, R3, and R4. This input voltage V1 may be defined according to each resistance of the resistor elements R2, R3 or R4 respectively established over the voltage-division resistor R1. In other words, the larger is the resistance of the resistor elements R2, R3, or R4, the larger is the input voltage V1. On the contrary, the smaller is the resistance of the resistor element R2, R3, or R4, the smaller is the input voltage V1. A relationship over the elements R2, R3, and R4 is defined as R2>R3>R4.

Furthermore, the multi-segment switch 23 in accordance with the instant disclosure may be a three-segment switch having a switching contact COM and three segmented contacts T1, T2, and T3. The switching contact COM is coupled to the controlled end VTH of the driving member 20, and also to the voltage source VREG via the voltage-division resistor R1. Those segmented contacts T1, T2, and T3 are correspondingly connected to the resistor elements R2, R3 and R4 with various resistances. Then the switching contact COM of the switch 23 may there-through connect to one of the segmented contacts T1, T2, and T3 due to a selected segment, and further to the voltage-division resistor R1 and one of the resistor elements R2, R3 and R4. Namely the multi-segment switch 23 is able to connect to the voltage source VREG, the voltage-division resistor R1, and any one of the resistor elements R2, R3, and R4 according to the selection. By means of voltage division, the input voltage V1 created across one of the resistor elements R2, R3, and R4 is then transmitted to the controlled end VTH of the driving member 20.

In one embodiment with discussion of the above description, the switching contact COM of the multi-segment switch 23 and the controlled end VTH of the driving member 20 are further connected to a capacitor C1. This capacitor C1 is used to store one input voltage V1 with respect to one of the resistor elements R2, R3 and R4. The capacitor C1 may provide a steady input voltage V1 to the controlled end VTH of the driving member 20.

Figure 3:
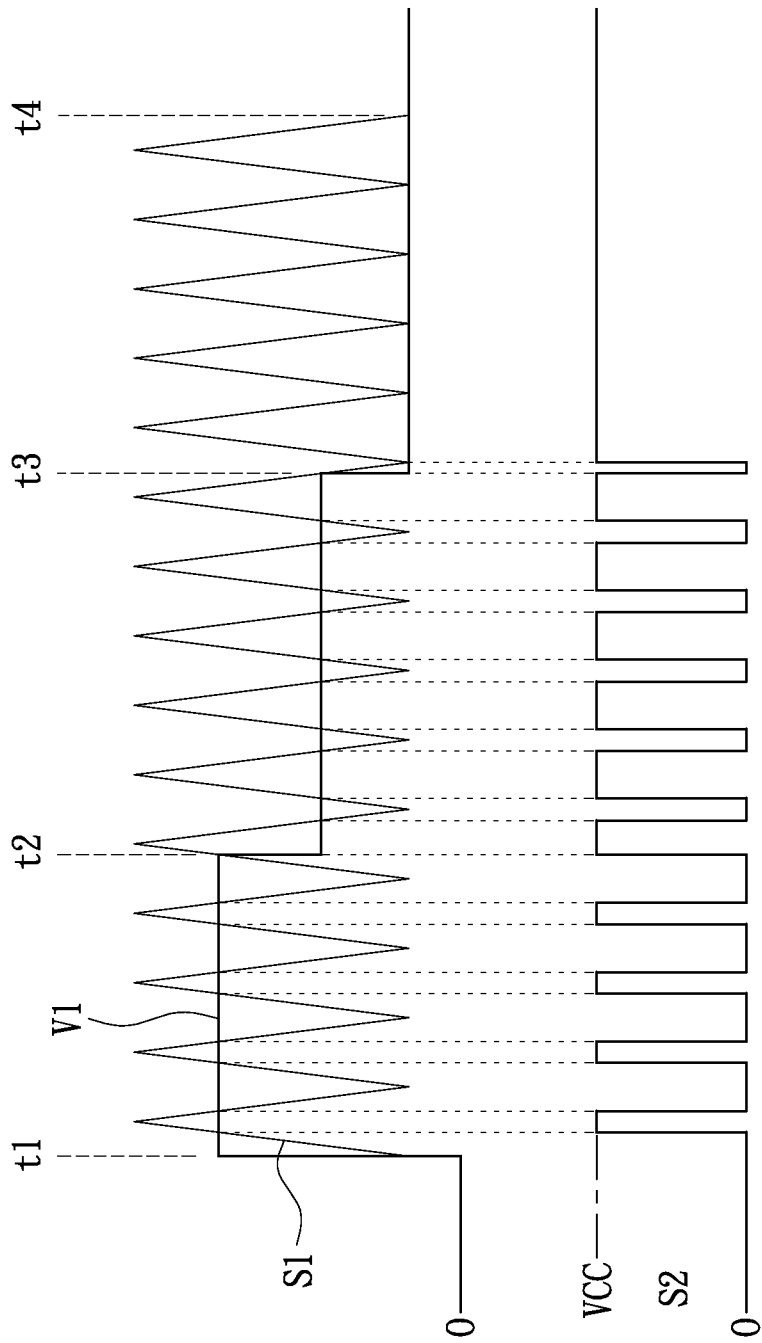
FIG. 3 is a wave pattern illustrating operation of the multi-speed control apparatus for the fan motor in accordance with the instant disclosure.

References are made to FIG. 2 and FIG. 3. The shown driving member 20 is configured to have an oscillation signal set contact CPWM. This oscillation signal set contact CPWM is connected to a capacitor C2. Due to the capacitance, an oscillation signal S1 is internally generated with respect to one of the various frequencies. The driving member 20 then generates a driving signal S2 for driving the fan motor 22 to a specific rotating speed in response to the oscillation signal S1 and the input voltage V1 sent to the controlled end VTH. The rotating speed may be the one selected from low-speed, medium-speed and high-speed rotations.

Furthermore, the driving signal S2 may be a pulse signal, particularly a pulse-width modulation signal, according to the present embodiment. In response to the comparison between the various input voltages V1 and the oscillation signal S1, the driving member 20 accordingly generates the pulse signals with various duty cycles for driving the fan motor 22 to a determined rotating speed. In an exemplary example, the driving signal S2 with higher duty cycle may drive the fan motor 22 to a relatively higher rotating speed. On the contrary, the driving signal S2 with lower duty cycle drives the fan motor 22 with lower rotating speed.

In FIG. 2 and FIG. 3, when the multi-segment switch 23 is interconnected electrically with the voltage source VREG, the voltage-division resistor R1, and the resistor element R2 (t1-t2), a higher input voltage V1 created over the resistor element R2 with voltage division is transmitted to the controlled end VTH of the driving member 20. This driving member 20 is configured to compare the higher input voltage V1 with the oscillation signal S1 within the driving member 20. In accordance with the result of the comparison, the driving signal S2 with a lower duty cycle is to drive the fan motor 22 with a low-speed operation.

In one further embodiment, a medium input voltage V1 created over the resistor element R3 with voltage division is sent to the controlled end VTH of the driving member 20 since the multi-segment switch 23 is interconnected electrically with the voltage source VREG, the voltage-division resistor R1, and the resistor element R3 (t2-t3). Also, this driving member 20 is configured to perform a comparison between the medium input voltage V1 and the oscillation signal S1 in the driving member 20. This result of comparison is referred to create the driving signal S2 with a medium duty cycle in order to drive the fan motor 22 to operate with a medium speed.

Still further, when the multi-segment switch 23 is interconnected with the voltage source VREG, the voltage-division resistor R1, and the resistor element R4 (t3-t4), a lower input voltage V1 across the resistor element R4 is transmitted to the controlled end VTH. Then the driving member 20 performs a comparison between the lower input voltage V1 and the internal oscillation signal S1 of the driving member 20. According to the result of comparison, the driving signal S2 with a higher duty cycle is generated to drive the fan motor 22 with high-speed operation.

Figure 4:
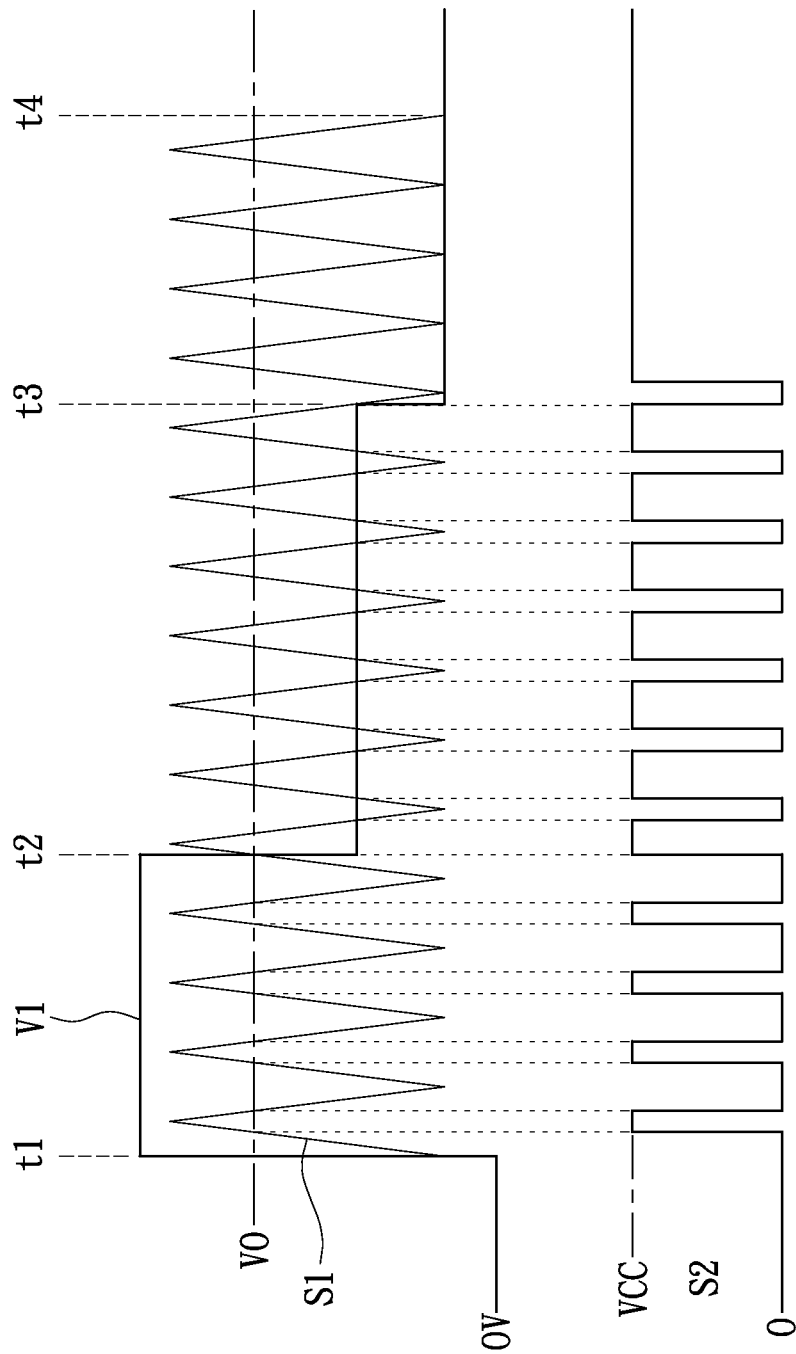
FIG. 4 shows one more wave pattern illustrating operation of the control apparatus in accordance with the instant disclosure.

In FIG. 2 and FIG. 4, the shown driving member 20 has a defined minimum rotating speed set contact RMI. This minimum rotating speed set contact RMI receives a minimum rotating speed critical voltage V0 from an external circuit 25. Since the external circuit 25 may be a voltage divider coupled with the voltage source VREG. In FIG. 2, the voltage divider is formed by in-series connected resistor R5 and resistor R6.

A dividing voltage is created over the resistor R6 by the voltage source VREG, and regarding as the minimum rotating speed critical voltage V0.

When the input voltage V1 received via the controlled end VTH of the driving member 20 is higher than a critical voltage V0 for the minimum rotating speed, that is the time t1 to t2, the driving member 20 is configured to compare the minimum rotating speed critical voltage V0 with the oscillation signal S1 within the driving member 20. The result of comparison is referred to create the driving signal S2 with a lowest duty cycle for driving the fan motor 22 to process an operation with lowest speed. Further, the input voltage V1 received by the controlled end VTH of the driving member 20 is lower than the minimum rotating speed critical voltage V0, that is the time after t2. The driving member 20, according to the input voltage V1 in each segment, is to drive the fan motor 22 to a specific rotating speed, such as the mentioned high-speed, medium-speed, or low-speed rotation.

The multi-speed control apparatus 2 in accordance with the instant disclosure mainly adopts the multi-segment switch 23 to process switching for delivering the various input voltages V1 to the driving member 20. In accordance with a minimum rotating speed, the driving member 20 drives the fan motor 22 to operate under the minimum rotating speed as the input voltage V1 is larger than the minimum rotating speed critical voltage V0. When the input voltage V1 is smaller than the critical voltage V0 for the minimum rotating speed, the switching process is configured to control the rotating speed of the fan motor 22 in segments. However, the driving member 20 may oppositely drive the fan motor 22 to operate under the minimum rotating speed when the input voltage V1 is smaller than minimum rotating speed critical voltage V0. Particularly, the rotating speed of the fan motor 22 in accordance with the invention is controlled in segments while the input voltage V1 is larger than the critical voltage V0 for the minimum rotating speed.

To sum up the above description, the disclosed multi-speed control apparatus incorporates a selection from the multi-segment switch to conducting the voltage source to one resistor element of the resistor circuit via the voltage-division resistor. The input voltage created through voltage division mechanism over the resistor element is transmitted to the controlled end of the driving member. Thus the driving member in response to the input voltage may actually drive the fan motor to a specific rotating speed without the influence of any environmental factor.

The above-mentioned descriptions represent merely the preferred embodiment of the present invention, without any intention to limit the scope of the present invention thereto. Various equivalent changes, alternations or modifications based on the claims of present invention are all consequently viewed as being embraced by the scope of the present invention.

What is claimed is:

1. A multi-speed control apparatus for a fan motor, comprising:
   a motor speed detection member for generating a feedback signal in response to a rotating speed of the fan motor;
   a resistor circuit, having resistor elements with various resistances;
   a voltage-division resistor;
   a multi-segment switch, electrically interconnecting the resistor circuit, the voltage-division resistor, and a voltage source, wherein the multi-segment switch optionally connects any one of resistor element to the voltage source and the voltage-division resistor for creating an input voltage across the resistor element by dividing voltage; and
   a driving member, having a detection end, a controlled end, and an output end, wherein the detection end is connected with the motor speed detection member, the controlled end is connected with the multi-segment switch, and the output end is connected with the fan motor; wherein the detection end receives the feedback signal, the controlled end receives the input voltage via the multi-segment switch, and the driving member is used to drive the fan motor to a specific rotating speed according to the input voltage.

2. The apparatus according to claim 1, wherein the driving member is implemented by an integrated circuit, a microcontroller, or a single chip.

3. The apparatus according to claim 1, wherein the motor speed detection member is a Hall sensing integrated circuit.

4. The apparatus according to claim 1, wherein the multi-segment switch includes a switching contact and multiple segmented contacts, and the switching contact is connected to the controlled end of the driving member, and connected to the voltage source via the voltage-division resistor; wherein the segmented contacts individually connect the resistor elements with various resistances.

5. The apparatus according to claim 4, wherein the switching contact of the multi-segment switch and the controlled end of the driving member further connect to a first capacitor, and the capacitor is used to stabilize the input voltage created across any resistor element by dividing voltage.

6. The apparatus according to claim 1, wherein the driving member includes a minimum rotating speed set contact, which is used to receive a critical voltage for a minimum rotating speed, and the driving member drives the fan motor to the minimum rotating speed when the input voltage is larger than the critical voltage.

7. The apparatus according to claim 6, wherein the driving member drives the fan motor to the specific rotating speed when the input voltage is smaller than the critical voltage for the minimum rotating speed.

8. The apparatus according to claim 7, wherein the driving member further includes an oscillation signal set contact, which is connected to a second capacitor, and the driving member internally generates an oscillation signal according to the second capacitor.

9. The apparatus according to claim 8, wherein the driving member generates a driving signal for driving the fan motor to the specific rotating speed according to a result of comparison between the oscillation signal and the input voltage.

10. The apparatus according to claim 9, wherein the driving signal is a pulse-width modulation signal.

* * * * *